United States Patent [19]
Eshelman

[11] 3,824,382
[45] July 16, 1974

[54] VECTOR GENERATOR

[75] Inventor: Wayne Lee Eshelman, Hillsboro, Oreg.

[73] Assignee: Tektronix, Inc., Beaverton, Oreg.

[22] Filed: Jan. 8, 1973

[21] Appl. No.: 321,875

[52] U.S. Cl. .............................. 235/150.53, 235/197
[51] Int. Cl. .............................................. G06g 7/26
[58] Field of Search ...... 235/197, 152, 183, 151.11, 235/150.53; 340/347 DA, 347 AD, 324 A, 324 AD; 328/142, 151, 127, 128

[56] References Cited

UNITED STATES PATENTS

| | | | |
|---|---|---|---|
| 3,373,273 | 3/1968 | Schubert | 235/197 |
| 3,480,767 | 11/1969 | Howe | 235/150.53 |
| 3,629,566 | 12/1971 | Brickner | 235/197 X |
| 3,649,825 | 3/1972 | Burrage | 235/197 |

*Primary Examiner*—Joseph F. Ruggiero
*Attorney, Agent, or Firm*—Adrian J. LaRue

[57] ABSTRACT

A vector generator provides a linear interpolation between points of a step function or dot waveform wherein the linear interpolation represents the vector sum of the time and amplitude components of the waveform. The vector generator comprises a sampling circuit, an integrator, and a feedback loop. Samples are taken at the appropriate times, setting up a differential current in the system. The differential current is integrated, producing a substantially linear voltage change from the first sample taken to a point at which the second sample is taken. By taking many samples, the vector generator can thus smooth a waveform produced by a digital-to-analog converter to produce a linear ramp from a staircase waveform, or even connect the dots of a dot display when such vector generators are used on both the vertical and horizontal axes.

13 Claims, 3 Drawing Figures

VECTOR GENERATOR

BACKGROUND OF THE INVENTION

In the field of electronic display devices, such as oscilloscopes and computer terminals, every attempt is made to provide the best representative display possible of the phenomena or information being presented. Time-varying functions and graphs are normally of an analog nature; however, much of the signal-processing circuits are necessarily digital. A display produced by such digital circuitry is usually a series of incremental steps or dots, which when viewed under the proper conditions, e.g., many steps or dots per small distance which the cathode-ray tube beam moves, may not be objectionable. However, for high-speed, high-gain oscillography in which the steps or dot density is relatively sparse, even the output of a digital-to-analog converter produces an objectionable or even incomprehensible display. For example, a sine wave being represented by a series of dots which are perhaps a few dots per cycle and at varying levels on the waveform may not even be distinguishable as a sine wave.

SUMMARY OF THE INVENTION

According to the present invention, a vector generator produces vectors which represent linear interpolations between points on a waveform produced by digital means. Such vectors are added together in the conventional manner of vector addition, that is, a new vector starting from the tip of the preceding vector, resulting in a smoothed and intelligible display. A conventional sampling circuit takes samples of the instantaneous amplitude values of the output waveform. In the preferred embodiment according to the present invention, the sampling circuit operates in synchronism with the discrete current steps at the output of a digital-to-analog converter. The clock circuit which generates the sampling strobe also enables a diode gate coincident with new digital data into the digital-to-analog converter.

The difference between total current available for the system, and the sum of the input current and a feedback current generated in accordance with voltage samples taken, establishes a differential current which is forced into a capacitor integrator. Since the current is essentially constant with respect to time for the short finite duration between samples, a substantially linear ramp voltage is produced at the output of the integrator. The ramp or vector, which begins at the level established by a first sample taken, terminates at the level established by the amount of current flowing into the capacitor for a predetermined length of time. At that point, a succeeding sample is taken and a subsequent vector begins to form. The speed at which vectors can be generated is limited only by the speed at which the digital-to-analog converter can operate, thus a smooth, pleasing display can be produced for high-speed waveform applications.

It is therefore one object of the present invention to provide linear interpolation between successive points on a waveform.

It is another object of the present invention to generate vectors which are the vector sum of the time and amplitude components of a waveform.

It is a further object of the present invention to smooth a waveform produced by digital means, for example, staircase waveforms or waveforms represented by incremental step functions.

It is still another object of the present invention to connect the dots of an incomprehensible dot display.

Other objects and attainments of the present invention will become apparent to those skilled in the art upon a reading of the following detailed description when taken in conjunction with the drawings in which there are shown and described illustrative embodiments of the invention. It is to be understood, however, that these embodiments are not intended to be exhaustive nor limiting of the invention.

DRAWINGS

DETAILED DESCRIPTION

Figures 1, 3:
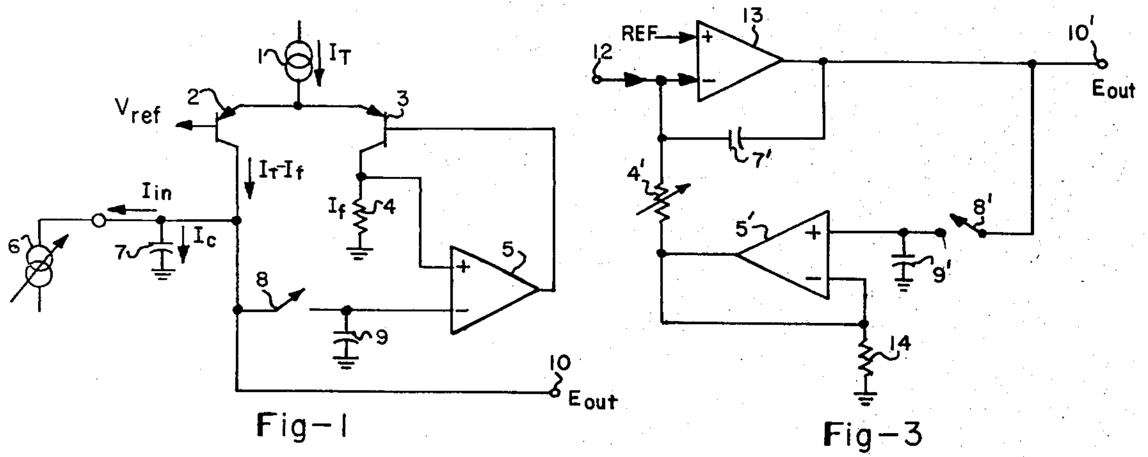
FIG. 1 is a schematic of the preferred vector generator circuit embodiment, showing the division of current through the circuit.
FIG. 3 is a second vector generator circuit embodiment according to the present invention.

Referring to FIG. 1, a schematic of the preferred embodiment according to the present invention is shown. Current source 1 supplies a substantially constant current $I_T$ for the system, which is divided in varying amounts through transistors 2 and 3. The current through transistor 3 flows through resistor 4 to ground, establishing a voltage potential at the collector of transistor 3 which is applied to the positive input of operational amplifier 5. The output voltage of operational amplifier 5 is fed back to the base of transistor 3, which in comparison to the reference voltage applied to the base of transistor 2 sets the biasing conditions for transistors 2 and 3. Resistor 4 corresponds to a feedback resistor, therefore the current through transistor 3 and resistor 4 is designated $I_f$. The remainder of the current from source 1, or $I_T - I_f$, flows through transistor 2 and is further divided between an input signal source 6, hich may be, for example, a digital-to-analog converter, and a capacitor 7. A conventional sampling circuit comprising a sampling gate 8 and a memory capacitor 9 is connected between an output terminal 10 and the negative input of operational amplifier 5.

An example of circuit operation is as follows. Assuming the initial conditions at time $T_o$ represented by the waveforms shown in FIG. 2, in which transistor 2 is conducting heavily and transistor 3 conduction $I_f$ is sufficient to keep the transistor turned on but is otherwise negligible, current signal source 6 is demanding all of the current supplied by transistor 2. That is, $I_{in} = I_T - I_f$, $I_c = 0$, and $I_f$ is very slight. Capacitor 7 has no charge, therefore the output voltage $E_{out}$ at terminal 10 is zero volts. Slightly before time $T_1$, sampling gate 8 takes a sample of the $E_{out}$ voltage. Capacitor 9 is very small compared to capacitor 7, and quickly charges to the $E_{out}$ level. Through operational amplifier action, the positive input of amplifier 5 steps to the negative input value, which in this case is zero volts. $I_f$, then, remains nil. The sampling strobe which closes the sampling gate occurs periodically and is synchronized to the input of digital data into the signal source 6 in this particular circuit.

At time $T_1$, the output of signal source 6 changes, stepping to the new value dictated by a change in digital information. The value of $I_{in}$ drops in a steplike fashion and the difference current, which is $I_T-(I_{in}+I_f)$, is forced into capacitor 7. Since this difference current is substantially constant over the short period of time between $T_1$ and $T_2$, a linear voltage $E_c = 1/C \int I_c\,dt$ is developed across capacitor 7. Thus the output voltage $E_{out} = E_c$ rises in a linear fashion, producing a vector. Since $\Delta E_{out} = I_cT/C$, and time $T$ and capacitance $C$ are preselected, the magnitude and direction of the vector is dependent entirely upon the value of $I_c$.

At time $T_2$, the positive and negative inputs to operational amplifier 5 stabilize at the new $E_{out}$ value sampled, increasing the value of $I_f$. Resistor 4 has a value chosen to be compatible with capacitor 7, thus $I_f \approx E_{out}C/T$. Resistor 4 can also be an adjustable resistor to provide the precise value of $I_f$ required to prevent overshoot or undershoot of vector values. Simultaneously at time $T_2$, the $I_{in}$ value changes to a new level dictated by the new digital information, and once again the difference current $I_T-(I_{in}+I_f)$, which may or may not be a new value from the preceding one, is forced into capacitor 7, producing a new vector.

Figure 2:
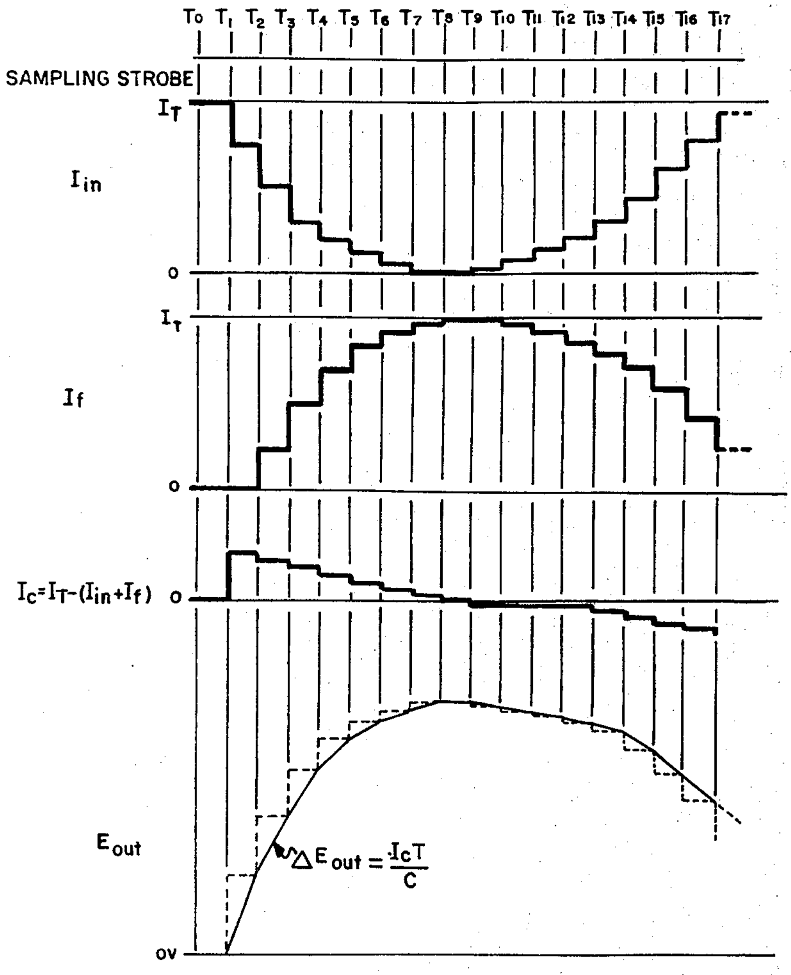
FIG. 2 is a ladder diagram showing waveforms in accordance with the schematic of FIG. 1.

The sequence repeats, generating new vectors, and as can be seen in FIG. 2, a smooth waveform is produced. By making the time between samples very short compared to the display time, continuous-appearing waveforms can be generated for any display time.

FIG. 3 shows a second embodiment according to the present invention, in which the capacitor integrator is a Miller integrator. Elements corresponding to those of FIG. 1 are identified by the prime symbol. Input signal current is applied or removed via input terminal 12. Capacitor 7' is connected from the output of operational amplifier 13 to the input, forming the Miller integrator. The positive input of amplifier 13 is set to a reference level, for example, ground, to establish the level at the negative input, which is the summing point for the operational amplifier. Feedback resistor 4' is adjustable to set the loop gain to unity, preventing overshoot or undershoot of the vector output. Sampling gate 8' takes samples of the output voltage in the conventional manner, and such samples are stored in capacitor 9'. Through operational amplifier action, the positive and negative inputs of amplifier 5' balance at the sampled voltage and hence a voltage is developed across resistor 4', establishing a current $I_f = E_{out}/R$ 4' $\approx E_{out}C/T$ through resistor 4'. This current flows to the summing point mentioned above, and the current not required by the source at terminal 12 is the difference current described earlier. The difference current flows into capacitor 7', driving the output terminal 10' in a linear fashion. Thus the waveforms of FIG. 2 can be seen to apply to the circuit of FIG. 3 as well as the circuit of FIG. 1.

While I have shown and described herein the preferred embodiments of my invention, it will be apparent to those skilled in the art that many changes and modifications may be made without departing from my invention in its broader aspects.

I claim:

1. A method of generating electronic vectors to connect data points to provide a waveform display, said method comprising:

sampling data points and storing the instantaneous voltage values thereof;

generating current values in accordance with said instantaneous voltage values;

summing in a summing circuit each of said generated current values with the next succeeding generated current values to derive difference current values representative of incremental changes in voltage magnitudes of said data points; and integrating said difference current values to produce corresponding voltage changes, said voltage changes being substantially linear interpolations between said data points.

2. The method according to claim 1 wherein sampling of data points occurs at predetermined intervals in synchronization with the input of data, and said difference current values are integrated over said predetermined intervals to establish precise vector magnitudes and directions.

3. A vector generator circuit to provide linear interpolation between data points, said circuit comprising:

data input means for producing data current values in said circuit;

sampling means for taking samples of said data points and storing the instantaneous voltage values thereof;

means for generating current values in accordance with said stored instantaneous voltage values;

summing means for algebraically summing said generated current values with successive data current values to thereby derive difference current values representative of incremental changes in data; and integrating means for integrating said difference current values to produce voltage vectors, said vectors being substantially linear interpolations between said data points.

4. The vector generator circuit according to claim 3 wherein said data input means comprises a digital-to-analog converter.

5. The vector generator circuit according to claim 3 wherein said sampling means comprises a sampling gate and a storage capacitor, said means for generating current values comprises an operational amplifier with feedback means, said summing means comprises an amplifier, and said integrating means comprises a capacitor.

6. The vector generator circuit according to claim 5 wherein said summing means and said integrating means comprise a Miller integrator.

7. The vector generator circuit according to claim 3 wherein said sampling means takes samples at predetermined intervals in synchronization with the input of data, and said integrating means integrates said difference current values over said predetermined intervals to establish precise vector magnitudes and directions.

8. The vector generator circuit according to claim 3 wherein said vectors are added together to produce a representative waveform connecting said data points for display, each of said vectors starting at each of said data points.

9. A circuit for generating vectors which are substantially linear interpolations between data points, comprising:

comparator means including a pair of controllable current-conducting devices;

first current source means for providing a constant current to said comparator means for conduction therethrough;

sampling means for taking samples of said data points and storing the instantaneous voltage values thereof;

control circuit means coupled to said sampling means and to said comparator means for controlling conduction of said pair of controllable currentconducting devices in accordance with said stored voltage values;

second current source means for conducting signal current in response to input data, said second current source means being connected to the output of one of said controllable current-conducting devices; and integrator means connected to said second current source means and to said one of said controllable current-conducting devices, said integrator means receiving a difference current derived from algebraic sum of said signal current and the current from said one of said controllable current-conducting devices, thereby providing a substantially linear voltage change in response thereto.

10. The circuit according to claim 9 wherein said data points are instantaneous values of output voltage from said integrator means, said data points being sampled at predetermined intervals in synchronization with changes in input data to said second current source means.

11. The circuit according to claim 10 wherein said integrator means integrates said difference current over said predetermined intervals to establish precise vector magnitudes and directions, each new vector starting from the previously sampled data point and thereby producing a substantially continuous waveform comprising vectors connecting a series of data points.

12. A circuit for generating vectors which are substantially linear interpolations between data points, comprising:

Miller integrator means comprising an amplifier and a feedback capacitor thereacross for integrating the algebraic sum of current at a summing point thereof;

first current path means providing signal current to said summing point of said Miller integrator means in response to input data signals;

sampling means connected to the output terminal of said Miller integrator means for taking samples of the output voltage and storing the instantaneous values thereof; and amplifier means including a second current path means connected between said sampling means and said summing point of said Miller integrator means for providing a second current to said summing point in accordance with said output voltage samples.

13. The circuit according to claim 12 wherein the output voltage data points are sampled at predetermined intervals in synchronization with changes in said input data signals, and said Miller integrator means integrates the algebraic sum of said signal current and said second current over said predetermined intervals to establish precise vector magnitudes and directions, each new vector starting from the previously sampled data point and thereby resulting in a substantially continuous waveform comprising vectors connecting a series of data points.

* * * * *